United States Patent [19]
Biegelsen et al.

[11] Patent Number: 5,941,501
[45] Date of Patent: Aug. 24, 1999

[54] PASSIVELY ADDRESSABLE CANTILEVER VALVES

[75] Inventors: David K. Biegelsen, Portola Valley; Patrick C. P. Cheung, Oakland; Andrew A. Berlin, Palo Alto; Warren B. Jackson, San Francisco; Lars-Erik Swartz, Sunnyvale; Raj B. Apte, Palo Alto; Richard H. Bruce, Los Altos, all of Calif.

[73] Assignee: Xerox Corporation, Stamford, Conn.

[21] Appl. No.: 08/711,338

[22] Filed: Sep. 6, 1996

[51] Int. Cl.$^6$ .................................................. F16K 31/02
[52] U.S. Cl. ................................ 251/129.01; 251/129.06
[58] Field of Search ........................... 251/129.01, 129.06

[56] References Cited

U.S. PATENT DOCUMENTS

| | | | |
|---|---|---|---|
| 3,243,181 | 3/1966 | Lyman | 271/195 |
| 3,405,977 | 10/1968 | Albright | 271/195 |
| 3,414,331 | 12/1968 | Fogg | 406/88 |
| 3,422,411 | 1/1969 | Smith, Jr. | 271/195 |
| 3,437,335 | 4/1969 | Gluskin | 271/195 |
| 3,550,964 | 12/1970 | Spyropoulos | 406/19 |
| 3,918,706 | 11/1975 | Craft | 271/195 |
| 4,493,548 | 1/1985 | Ateya | 355/3 FU |
| 4,577,854 | 3/1986 | Bachman et al. | 271/227 |
| 4,585,209 | 4/1986 | Aine et al. | 251/129.02 |
| 4,618,292 | 10/1986 | Judge et al. | 406/19 |
| 4,874,273 | 10/1989 | Tokisue et al. | 406/19 |
| 5,284,179 | 2/1994 | Shikida et al. | 37/334 |
| 5,323,999 | 6/1994 | Bonne et al. | 251/129.06 X |
| 5,497,987 | 3/1996 | Henn et al. | 406/88 |

FOREIGN PATENT DOCUMENTS

| | | | |
|---|---|---|---|
| 0 518 524 A2 | 12/1992 | European Pat. Off. . | |
| 214554 | 8/1989 | Japan | 271/227 |
| 243418 | 9/1990 | Japan | 406/19 |
| 2226538 | 7/1990 | United Kingdom | 271/195 |
| 2275903 | 3/1994 | United Kingdom | 406/19 |
| WO 90/13750 | 11/1990 | WIPO . | |

OTHER PUBLICATIONS

European Search Report for corresponding EP Application No. 97306848.9–1263.

Shikida, M.; Sato, K. Characteristics of an Electrostatically–Driven Gas Valve under High–pressure Conditions. *Proceeding of the Workshop on Micro Electro Mechanical Systems (MEM, OISO)*, Jan. 25–28, 1994, No. Workshop 7, Jan. 25, 1994, Institute of Electrical and Electronics Engineers, pp. 235–240.

Konishi, S. et al., A Conveyance System Using Air Flow Based on the Concept of Distributed Micro Motion Systems. Journal of Microelectromechanical Systems, vol. 3, No. 2, Jun. 1994, pp. 54–58.

Konishi,S. et al., System Design for Cooperative Control of Arrayed Microactuators. Proceedings of the IEEE Micro Electro Mechanical Systems 1995, IEEE, Piscataway, NJ, USA 95CH35754, pp. 322–327.

Paivanas, J.A. et al., Air Film System for Handling Semiconductor Wafers. IBM J. Res. Develop., vol. 23, No. 4, Jul. 1979, pp. 361–375.

*Primary Examiner*—Kevin Lee
*Attorney, Agent, or Firm*—Robert A. Burtzlaff

[57] ABSTRACT

A bistable valve useful for paper handling applications is disclosed. The valve can be batch fabricated in two dimensional valve arrays, with each valve in the array being controlled by passive matrix addressing. Typically, each valve includes a valve housing an electrically conductive movable element such as cantilever beam, diaphragm or film. Valve action is provided by use of housing embedded switching electrodes for moving the movable element between an aperture blocking position and an aperture open position. To reduce unswitched movement when the switching electrode bias is reduced or not present, electrostatic or mechanical catches can be used.

8 Claims, 9 Drawing Sheets

PASSIVELY ADDRESSABLE CANTILEVER VALVES

FIELD OF THE INVENTION

The present invention relates to electronically addressable valves suitable for controlling fluid flow. More specifically, the present invention relates to a passively addressable array of valves for controlling air jet operation, with particular utility for paper handling applications.

BACKGROUND AND SUMMARY OF THE INVENTION

High speed electronic control of fluid flow using inexpensive batch fabricated valve arrays is potentially critical for numerous applications, including distributed actuator controls, paper or object positioning, dynamic control of fluid instabilities, or microcontrol of microchemical reactions and biological assays. However, large two dimensional arrays of microvalves (e.g. 100×100 valves or more) can be difficult to construct to the necessary tolerances, and reliable addressing of specific valves to open or close on a millisecond time scale is often not feasible.

The present invention provides a novel row and column bistable valve array, with each valve in the array being controlled by passive matrix addressing. In one preferred embodiment, the array includes a plurality of bistable valves, with each bistable valve defining an aperture therethrough and having electrically conductive switching electrodes within the housing, generally positioned adjacent to or opposite from the aperture. A plurality of electrically conductive bistable movable elements for blocking the defined aperture are attached within the housing, with each bistable movable element respectively attached to each of the plurality of valves. Each bistable movable element is switchable between a stable aperture blocking position and a stable aperture open position. For example, if a bistable movable element is a cantilever beam or movable diaphragm, it can be maintained in a normally open position by fluid pressure. Alternatively, fluid pressure can be used to maintain the bistable movable element in a normally closed position, blocking the aperture. The switching electrodes are then arranged to apply an electrostatic switching force to the cantilever beam that counteracts the fluid pressure, either opening or closing the valve. In one embodiment of the invention, selective opening or closure of a valve is enabled by use of a first row address switching voltage source connected to each one of the bistable movable elements for maintaining a subset of the plurality of valves in a row at one of a non-switching and a switching voltage, and a second column address switching voltage source is connected to each one of the electrically conductive switching electrodes for maintaining a subset of the plurality of valves in a column at one of a non-switching and a switching voltage. As will be appreciated, not all valves in any particular array need to be individually addressable, and it is of course possible to reverse row and column connections.

The combination of cantilever beams and fluid pressure is only one possible embodiment of the invention that can be used as part of a passive matrix addressed valve array. In another preferred embodiment, each valve includes a valve housing having an aperture plate defining an aperture therethrough, and an opposing plate positioned in spaced apart relationship to the aperture plate. A flexible electrically conductive film or strip is attached at its first end to the aperture plate and at its second end to the opposing plate. Valve action is provided by use of at least two switching electrodes for moving the flexible film between an aperture blocking position and an aperture open position, with at least one of the switching electrodes positioned adjacent to the aperture plate and at least one of the switching electrodes positioned adjacent to the opposing plate. To reduce unswitched movement when the switching electrode bias is reduced or not present, at least two catches are used. Generally, one of the catches is positioned adjacent to the aperture plate and at least one of the catches positioned adjacent to the opposing plate. These catches hold the film or strip in either a generally S-shaped aperture blocking or non-blocking position when switching forces are absent, but are insufficiently strong to prevent switching when the switching electrodes are activated.

The catches can be either mechanical, electrical, or even electromechanical. For example, an electrical catch can be provided by two catch electrodes, held at a constant catch voltage bias. If the catch voltage bias is substantially less than the switch voltage bias applied to the switching electrodes when moving the flexible film, the catches do not substantially interfere with switch action, yet still help maintain the flexible film in a constant position even when the switch voltage is no longer present. Advantageously, the provision of electrical catches minimizes migration or movement of the S-shaped flexure along the film in response to fluid forces. Similarly, mechanical catches that rely on lip structures, detents, or other suitable devices, alone or in combination with electrical catches, can result in an applied stress bias that holds the film in position with a small catch force. Again, this catch force is usually substantially less than the switching force applied when switching the film between a blocking and non-blocking position.

In other preferred embodiments, various valve modifications can be employed to enhance valve operation, minimize power requirements, and increase valve switching times. For example, instead of a circular or elliptical aperture cross section, the aperture can be defined to have at least one acute vertex, providing a point release for air inflow or outflow. The flexible film does not have to be a straight, homogenous strip, but can be varied in composition, width, thickness, and stiffness along its length. For example, the flexible film can have a first narrow neck attachable to the aperture plate, a second narrow neck attachable to the opposing plate, and a wide body therebetween capable of assuming a generally S-shaped configuration. In other configurations, the flexible film can have a generally U-shaped configuration, with a first end attachable to the aperture plate and a second end attachable to the opposing plate. These and other mechanical modifications to the flexible film allow for tuning valve response time, decreasing or increasing valve pressure strengths, and varying electrostatic interactions.

Advantageously, like cantilever type valves, valve structures including movable elements such as the foregoing S-shaped or curved films can be arranged into large passively addressable arrays. Such arrays include a plurality of valves, with each valve defining an aperture therethrough, and a plurality of flexible films respectively attached to each of the plurality of valves, with each flexible film independently addressable to alternately switch between an aperture blocking position and an aperture open position. A switching voltage source is used to maintain a subset of the plurality of valves at either a non-switching voltage or a switching voltage. When switching electrodes are activated for applying an electrostatic switching force to move the plurality of flexible films, only that subset of the plurality of valves having flexible films maintained at the switching voltage switch between the aperture blocking position and an aperture open position. In practice, usually two address lines (with each address line having two possible voltages) connected to each valve in a valve array are required. Normally, all address lines are maintained at the same voltage (e.g. 30 volts or 0 volts). To switch the film from a blocking to a non-blocking position, or vice versa, it is necessary to switch the voltages. When a particular valve in a two dimensional row and column array is to be switched, the voltage applied to all flexible strips in a particular row (or column) is changed to a higher switching voltage. Ordinarily, only that valve at the intersection of the row (or column) and column (or row) of addressed switching electrodes actually switches, with the others valves addressed in the array remaining unchanged. Of course, by appropriate row and column addressing, multiple switching in parallel is possible.

In a preferred embodiment, the use of independently addressable cantilever, diaphragm or S-valves allows for high spatial precision transport of objects, including flexible objects such as paper. For certain applications, including processing of high purity or delicate materials, contamination or damage to the object may result from mechanical grasping or contact. This is particularly true for high speed processing systems, which may damage objects simply by engaging them. For example, high speed rollers may damage paper through differential engagement of misaligned paper with the roller, resulting in ripping or tearing of the paper. Fortunately, mechanical or frictional engagement is only one possible means for moving an object. Object drive mechanisms based on various fluid support techniques have long been employed to move delicate objects without requiring solid mechanical contact. For example, instead of using conventional belts, conveyors or rollers, paper moving through xerographic copier systems can be supported on a laminar air flow, or uplifted and moved by valve controlled air jets. This is particularly advantageous, for example, when sheets of paper carrying unfixed toner images must be moved between a photoconductive drum and a fusing station where the toner image is fixed. With conventional physical rollers, the continuing possibility of dynamic distortions to the toner image, or even slight misalignments resulting in image degradation, must always be considered.

Additional functions, objects, advantages, and features of the present invention will become apparent from consideration of the following description and drawings of preferred embodiments.

DETAILED DESCRIPTION OF THE INVENTION

Figure 1:
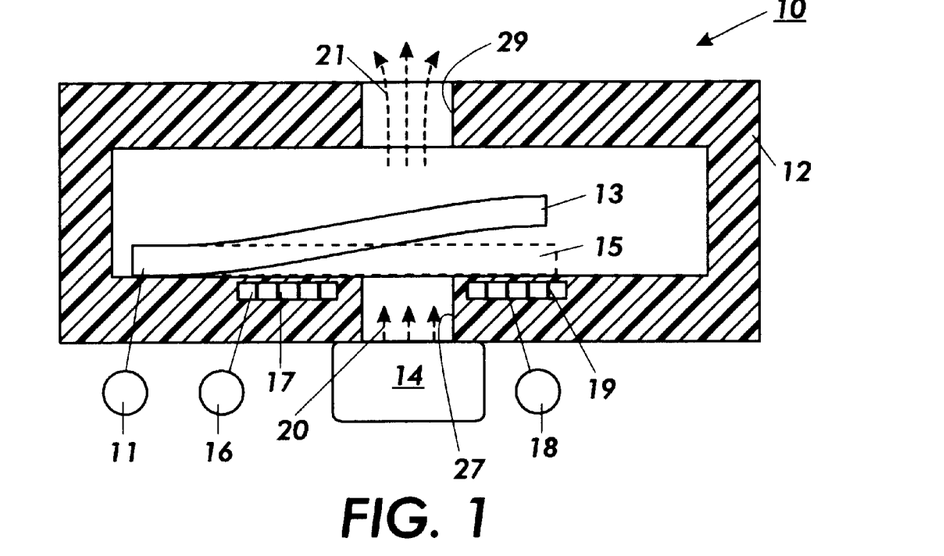
FIG. 1 illustrates a side cross sectional view of a normally open cantilever valve suitable for arrangement into valve arrays and capable of being closed by selective passive matrix addressing.

A normally open cantilever valve 10 according to one embodiment of the invention is illustrated in side cross sectional view in FIG. 1. The valve 10 includes a valve housing 12 that defines an aperture 29 for directing a fluid jet 21 of air or other desired fluid outward. The housing 12 is connected to a fluid pressure source 14 via an inlet port 27 that directs an inflow of fluid 20 into the housing 12. The fluid pressure source 14 can be provided by a fan, vacuum source, pressurized air source, or any other conventional device suitable for modifying available fluid pressure. A cantilever beam 13 is positioned in fixed attachment to the housing 12 so as to be capable of blocking the inlet port 27 under predefined conditions. The cantilever beam 13 is electrically conductive and attached in electrical connection to a voltage source 11. The housing 12 also incorporates electrodes 17 and 19, which are respectively connected to voltage sources 16 and 18.

In operation, the inflow of fluid 20 into the housing 12 maintains the cantilever 13 at the normally open position indicated by the solid line. The fluid flows around the cantilever 13 and exits from the housing through aperture 29. To switch the valve 10 to a closed position, the voltage sources 11, 16, and 18 are set to induce a voltage differential between the cantilever 13 and the electrodes 17 and 19. If the voltage differential is suitably high, and the electrostatic attraction between the cantilever beam 13 and electrodes 17 and 19 is beyond a certain threshold, the beam 13 will move to position 15 (indicated by dotted outline), blocking the inlet port 27. Advantageously, because electrostatic forces are an inverse quadratic function of distance, once the cantilever beam has moved to position 15 the voltage differential required to maintain that closed position adjacent to the electrodes is much less than that required to move the beam 13 from its original position (as noted in solid outline). For example, it may take a voltage differential of 60 volts to move beam 13 to position 15, with a lesser voltage of 30 volts being insufficient to cause substantial movement of the beam 13. However, once the beam 13 is at position 15, a voltage differential of only 30 volts is more than sufficient to maintain the valve in a closed position. As will be appreciated, in certain embodiments of the invention the valve can also be caused to remain in a closed position by application of a small catch voltage (for example, 10 volts) to one of electrodes 17 or 19 that is sufficient to hold the cantilever in position adjacent to the electrodes until released.

Figure 2:
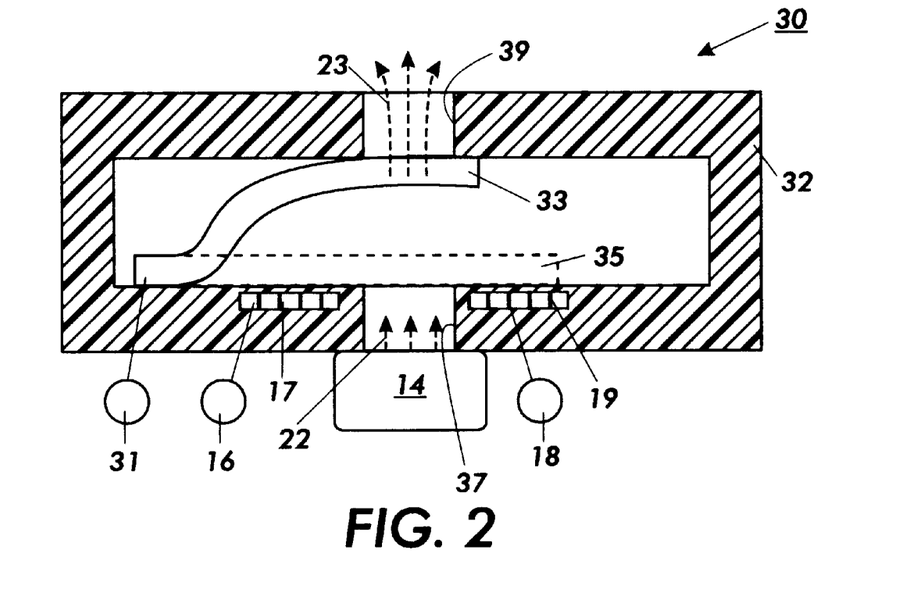
FIG. 2 illustrates a side cross sectional view of a normally closed cantilever valve suitable for arrangement into valve arrays and capable of being opened by selective passive matrix addressing.

An alternative valve embodiment similar to valve 10 is illustrated in FIG. 2. In contrast to valve 10, a valve 30 in FIG. 2 is normally closed. The valve 30 includes a valve housing 32 that defines an aperture 39 for directing a fluid jet 23 of air or other desired fluid outward. The housing 32 is connected to a fluid pressure source 14 via an inlet port 37 that directs an inflow of fluid 22 into the housing 32. A cantilever beam 33 is positioned in fixed attachment to the housing 32 to normally block the aperture 39 when subjected to a certain minimum fluid pressure. The cantilever beam 33 is electrically conductive and attached in electrical connection to a voltage source 31. Like valve 10, the housing 32 also incorporates electrodes 17 and 19, which are respectively connected to voltage sources 16 and 18.

In operation, the inflow of fluid 22 into the housing 32 maintains the cantilever 33 at the normally closed position indicated by the solid line. To switch the valve 30 to an open position that allows exit of air 23 from aperture 39, the voltage sources 31, 16, and 18 are set to induce a voltage differential between the cantilever 33 and the electrodes 17 and 19. If the voltage differential is suitably high, and the electrostatic attraction between the cantilever beam 33 and electrodes 17 and 19 is beyond a certain threshold, the beam 33 will move to position 35 (indicated by dotted outline), unblocking the aperture 39. As compared to normally open valves such as disclosed in FIG. 1, the normally closed valve of FIG. 2 has an additional advantage in that leakage of air around the cantilever 33 as it is initially pulled away from its blocking position quickly reduces fluid pressure forces, making it easier to electrostatically pull the cantilever beam 33 toward the electrodes 17 and 19. Again, because electrostatic interactions are an inverse quadratic function of distance, once the cantilever beam has moved to position 35 the voltage differential required to maintain that open position adjacent to the electrodes is much less than that required to move the beam 33 from its original position (as noted in solid outline). For example, it may take a voltage differential of 30 volts to move beam 33 to position 35, with a lesser voltage of 20 volts being insufficient to cause substantial movement of the beam 33. However, once the beam 33 is at position 35, a voltage differential of only 10 volts is more than sufficient to maintain the valve in a open position. Note that because of the mechanical spring forces exerted by bistable cantilever beams in the described embodiments, even if no voltage differential is imposed the valves will respectively remain in their normally open or closed position.

Figure 3:
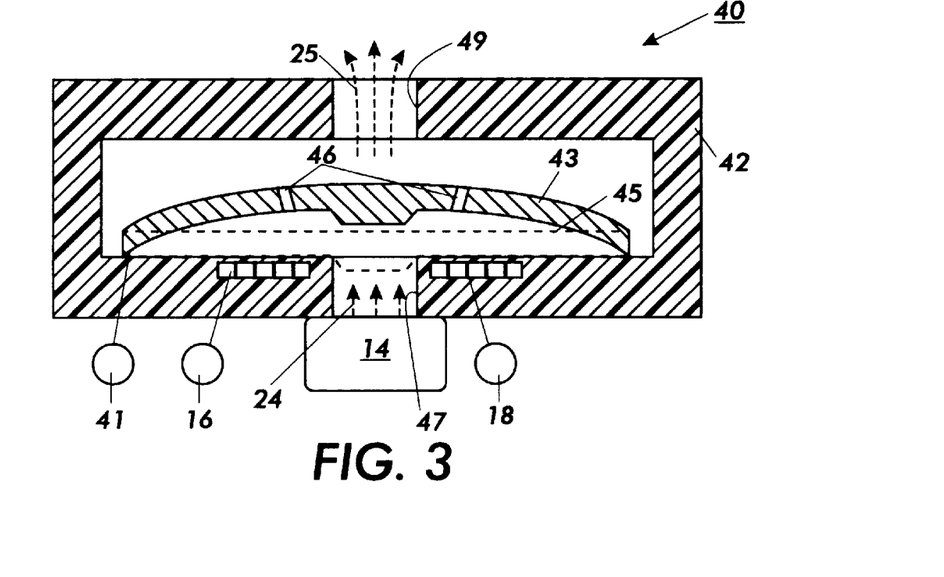
FIG. 3 illustrates a side cross sectional view of a normally opened diaphragm type valve suitable for arrangement into valve arrays and capable of being closed by selective passive matrix addressing.

Another cantilever beam type valve variant similar to that shown in FIG. 1 is disclosed in FIG. 3. A normally open diaphragm type valve 40 (physically equivalent to a circular beam multiply pinned around its edges) includes a valve housing 42 that defines an aperture 49 for directing a fluid jet 25 of air or other desired fluid outward. The housing 42 is connected to a fluid pressure source 14 via an inlet port 47 that directs an inflow of fluid 24 into the housing 42. A diaphragm 43 is positioned in fixed attachment to the housing 42 so as to be capable of blocking the inlet port 47 under predefined conditions. The diaphragm 43 is electrically conductive and attached in electrical connection to a voltage source 41. The housing 22 also incorporates electrodes 17 and 19, which are respectively connected to voltage sources 16 and 18. Operation is similar that previously discussed in connection with FIG. 1, with fluid passing through passageways 46 in the diaphragm 43 when the valve is in a normally open position, and fluid flow being blocked when it is switched to closed position 45. Again, as will be appreciated, variants such as normally closed diaphragm valves can be constructed in accordance with the present invention.

Figure 4:
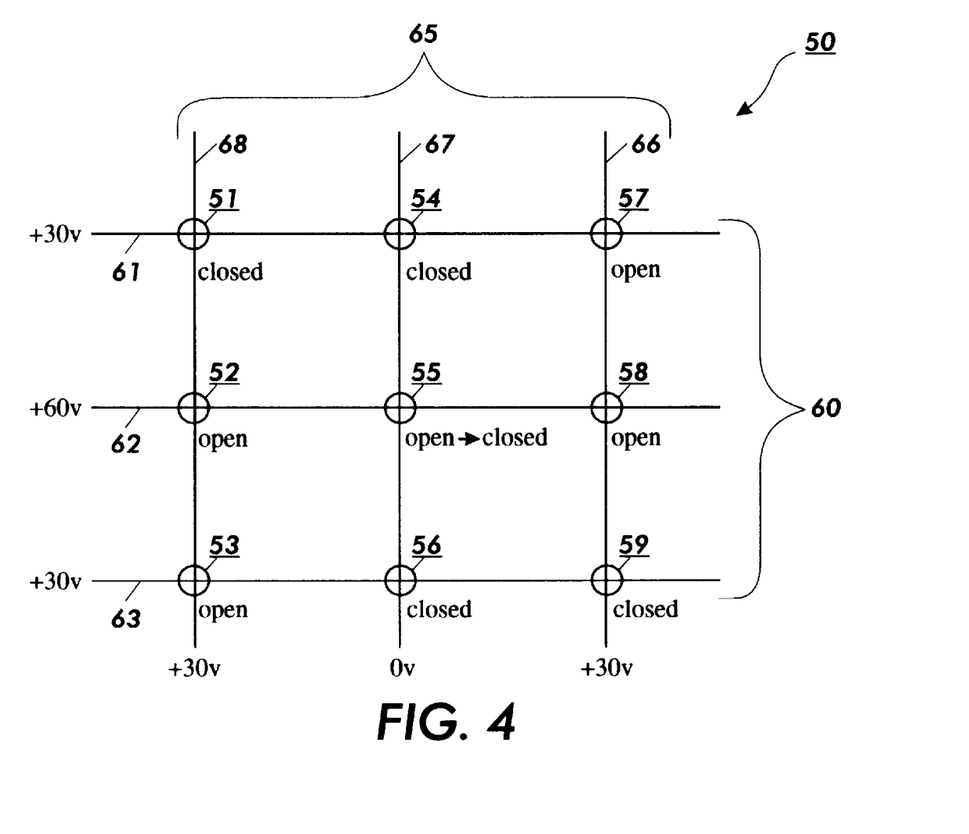
FIG. 4 is a schematic view illustrating voltage addressing of nine valve sites, with one valve being switched through passive matrix addressing while the remaining valves remain unswitched.

Switching operation through passive matrix addressing of arrays of valves having structures in accordance with the foregoing embodiments of the invention can best be seen with reference to FIG. 4. A nine valve array 50 is schematically illustrated in FIG. 4, with nine cantilever or diaphragm type valves 51–59 being controlled by voltage address lines. Each valve 51–59 is connected to a single row address line 60 (one of lines 61, 62, or 63) and a single column line 65 (one of lines 66, 67, 68).

FIG. 4 illustrates the procedure for switching valve 55 while leaving the remaining valves 51–54 and 56–59 unswitched. Normally, all row and column address lines are maintained at the same voltage (in this case 30 volts), giving a 0 volt differential insufficient to induce switching. To switch valve 55, voltage in row address line 62 is raised from 30 volts to 60 volts, and voltage in column address line 67 is dropped from 30 volts to 0 volts. This leaves valves 51, 57, 53, and 59 unswitched, since there is no voltage change at all, with all address lines remaining at a 30 volt differential. Valves 52 and 58 are also unswitched. Even though the voltage has been raised to 60 volts from its previous 30 volts, the voltage differential between the cantilever beam and the electrodes is still only 30 volts, not enough of a differential to induce electrostatic switching since the voltage differential is below the 60 volt switching threshold. Similarly, valves 54 and 56 remains unswitched, since the voltage differential is also again only 30 volts. However, the specifically addressed valve 55 will switch. In valve 55 the new voltage differential is 60 volts, enough to cause switching. As those skilled in the art will appreciate, this illustrative example can be extended to allow for passive matrix addressing of arbitrary valve elements in large valve arrays by simple voltage addressing.

The present invention also encompasses other bistable, but non-cantilever or diaphragm type valves that can be passive matrix addressed. For example, a valve 110 according to another embodiment of the present invention is illustrated in partially cut away perspective view in FIG. 5. The valve 10 includes a valve housing 112 that defines a port 114 and an aperture 116 with an acute vertex 126 for inlet or outlet of fluid. In the illustrated embodiment the port 114 is best configured as an inlet port for pressurized air, while the aperture 116 is a selectively blockable outlet. However, as those skilled in the art will appreciate, inlets and outlets can be reversed or repositioned as necessary for best operation.

Figure 5:
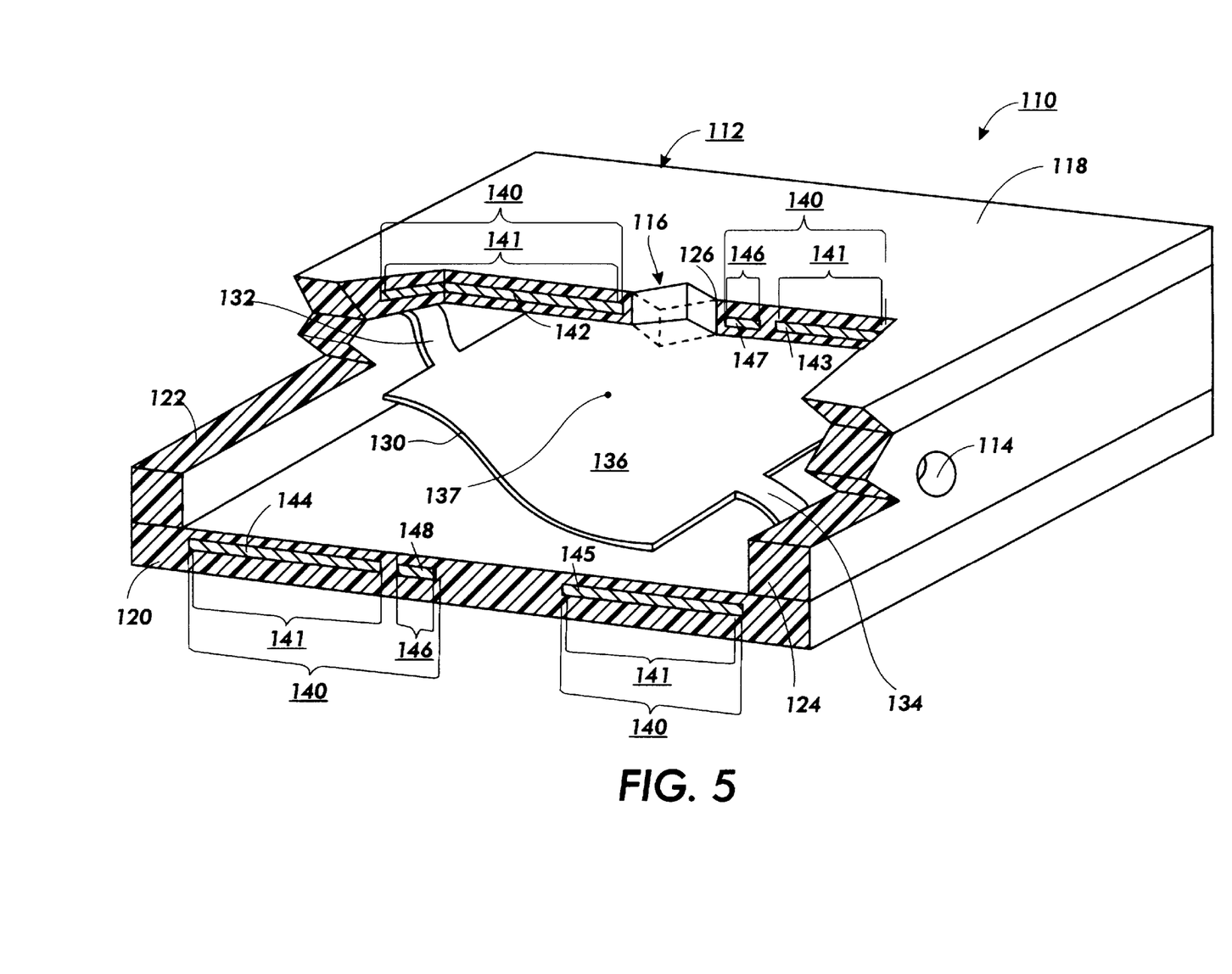
FIG. 5 illustrates another valve capable of being passively matrix addressed in accordance with the present invention in partially cut away perspective view, showing an S-shaped film moving from an aperture blocking position to a non-blocking position.

The valve housing 112 is formed from an aperture plate 118 (defining the aperture 116), an opposing plate 120 positioned in spaced apart parallel relationship to the aperture plate 118, and spacers 122 and 124 positioned between the plates 118 and 120. In the illustrated embodiment, each of these structural elements (plates 118 and 120, spacers 122 and 124) are separately formed as distinct layers that are later bonded together, however, it is of course possible to use micromachining, plastic deposition, or other techniques to form unitary structures.

A flexible film 130 is sandwiched between the plates 118 and 120. As illustrated, the film 130 has a relatively wide body 136 and a pair of narrow necks 132 and 134. Neck 132 is pinned in position between plate 118 and spacer 122, while neck 134 is pinned between plate 120 and spacer 124. Because the combined length of the necks and body of the film is greater than the point to point distance between the pinned necks, in side view the body 136 is not straight, but instead forms a generally S-shaped curve. The center 137 of this S-curve is not fixed, but can move between a position near spacer 124, to a position near spacer 122. In the illustrated embodiment of FIG. 5, the center 137 of film 30 is about midway between spacers 122 and 124, in a position that does not block aperture 116.

To reliably switch the flexible film between an aperture 116 blocking position and an aperture non-blocking position, and vice-versa, requires use of electrodes 140 embedded in plates 118 and 120. The electrodes 140 can be divided into two classes, the first being switching electrodes 141 that pull the bulk of the body toward one or the other plates 118 and 120, and the second being catch electrodes 146 that hold the film 130 in position when the switching electrodes are not exerting strong electrostatic forces to attract the body 136 of the film 130 toward the plates. Electrodes 142 and 143 are switching electrodes embedded in the aperture plate 118, while electrodes 144 and 45 are switching electrodes embedded in the opposing plate 120. As will be appreciated, during switching the electrodes 142 and 143 will generally be activated through selective addressing at the same voltage, while electrodes 144 and 145 will be maintained at some voltage differential with respect to electrodes 142 and 143. The catch electrodes 146, consisting of electrode 147 in plate 118 and electrode 148 in plate 20, are typically smaller in area than the switch electrodes, and can be constantly maintained at some small voltage with respect to ground.

Valves 10, 30, 40, or 110 can be constructed with a variety of machining or micromachining techniques, including those associated with conventional integrated circuit or printed circuit board fabrication. For example, chemical etching, electron beam lithography, photolithography, or other standard batch processing technologies can be used to define necessary air conduits, control or circuitry conduits, holes, orifices, and apertures. Alternatively, injection molding, high precision numerically controlled machines, or stereolithography can be employed for low cost batch construction of valves. Materials used in construction may include plastics, metals, glasses, or ceramics. In one possible embodiment, plastics, epoxies, glass, silicon, polysilicon, silicon nitride, silicon, silicon oxide, oxynitride, plastics or aluminum, or any other available material suitable for lithographic processing can be used to define the necessary valve housing, valve structures, or conduits. Electrodes can be any conductive metal or polymer, while the flexible strip can be constructed from plastic films, aluminum coated mylar, plated nickel, or polyimide sandwiched aluminum. In typical applications, the housing of each valve 10, 30, 40 or 110 will be less than 100 cubic millimeters in volume (10×10×1 millimeters), while the flexible strip in the valve housing of valve 110 will generally have dimension on the order of 0.1 to 10 millimeters in width, 0.5 to 50 millimeters in length, and 1 to 10 microns in thickness. Large arrays of the valves can be constructed, with meter scale arrays having tens of thousands of individual valves being contemplated.

Figure 6:
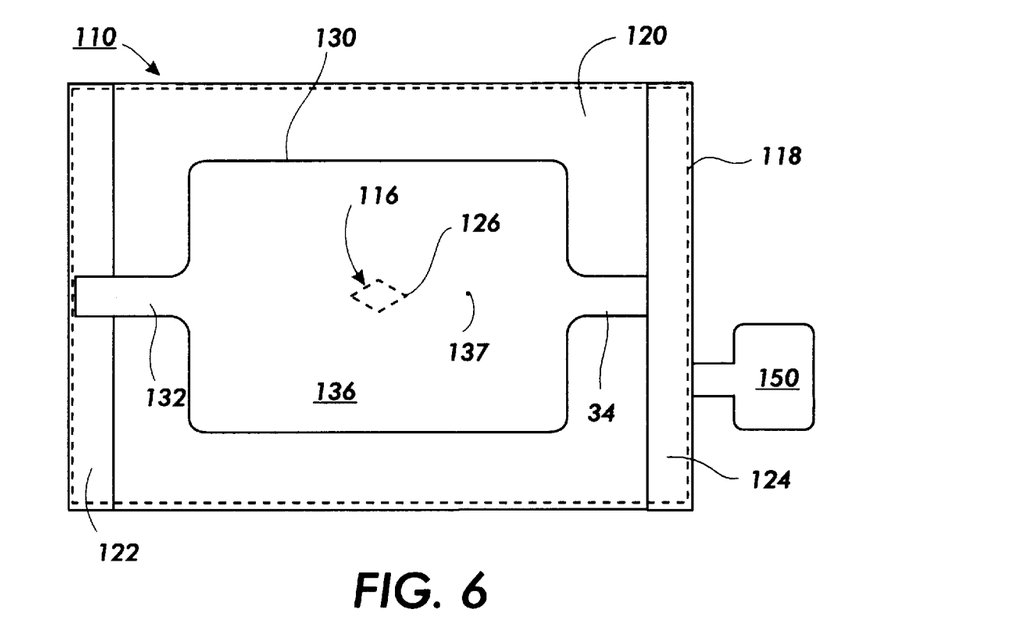
FIG. 6 is a top view of the valve of FIG. 5, with a top aperture plate removed to better illustrate positioning of the S-shaped film and the relative placement of the S-shaped film's dual neck and body.
Figure 7:
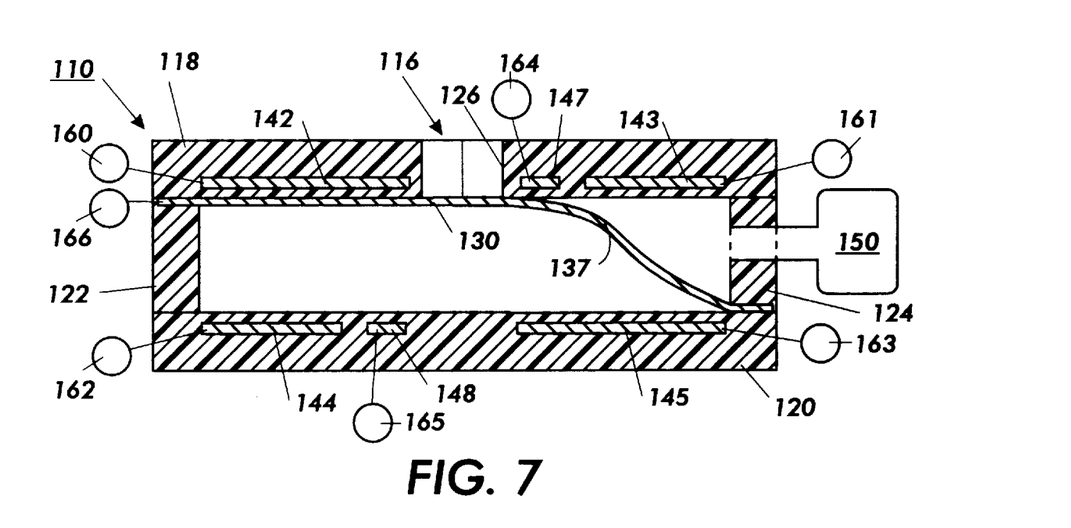
FIG. 7 is a side cross sectional view of the valve of FIGS. 5 and 6, with the S-shaped film shown in an aperture blocking position.

Operation of valve 110 is best discussed in connection with FIGS. 6, 7, and 8. As seen in FIG. 6, a fluid pressure source 150 is connected to the valve. The fluid pressure source can be provided by a fan, vacuum source, pressurized air source, or any other conventional device suitable for modifying available fluid pressure. The fluid pressure source (typically filtered air) enters valve 110 and exits through aperture 116, unless aperture 116 is blocked by film 130, as seen in cross section in FIG. 7. Electrodes 142 and 143 are respectively connected to voltage sources 160 and 161, electrodes 144 and 145 are respectively connected to voltage sources 162 and 163, and the film 130 is connected to voltage source 166. In this unswitched view, voltage sources 160, 161, 162, 163, and 166 are substantially identical, with no significant voltage differentials. The film 130 is maintained in its blocking position in part by differential electrostatic attractive forces between the film 130 and the catch electrode 147, maintained at a small differential voltage with respect to the film 130 by a voltage source 164. This small voltage differential between the film 130 and the catch electrode 146 helps pin the S-curved film in position, and prevents movement of the center 137 of this S-curve between spacer 124 and spacer 122. Note that because of the relatively small voltages employed (typically less than 5–20 volt differentials with respect to film 30) and the substantial distance between the film 130 and the catch electrode 148, it is possible that voltage source 165 can constantly maintain a small voltage on catch electrode 148 without causing impairment of film 130 movement during switching.

Figure 8:
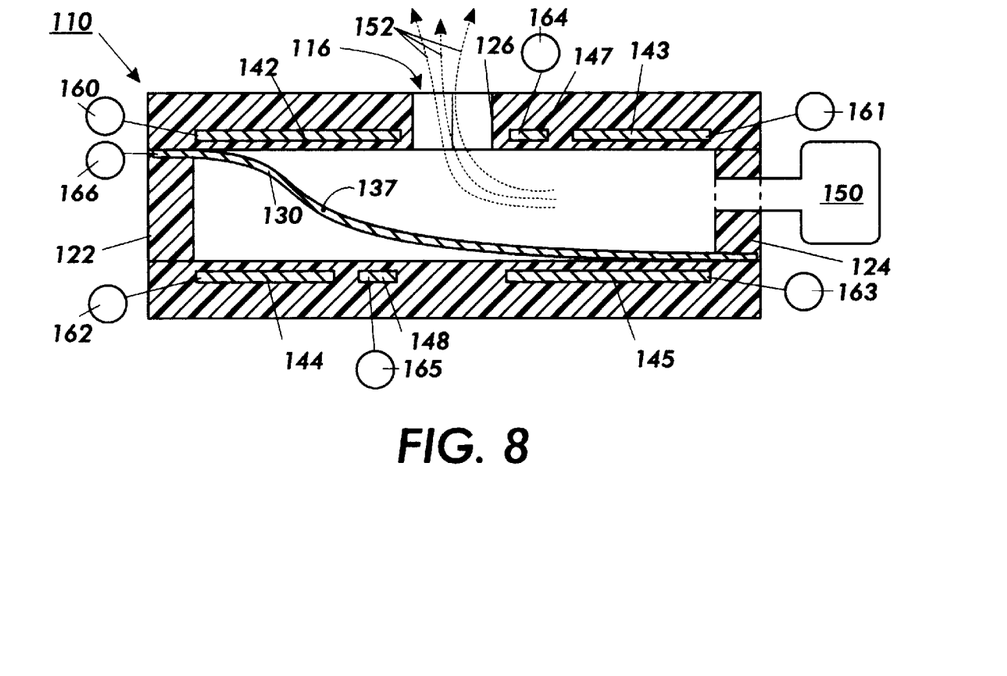
FIG. 8 is a side cross sectional view of the valve of FIGS. 5 and 6, with the S-shaped film pulled down against an opposing plate by electrostatic interaction with electrodes into an aperture non-blocking position.

To unblock the aperture 116, as seen in FIG. 8, the switch electrodes and voltage source 166 connected to the film 130 are activated to provide a substantial voltage differential (typically 25–150 volts, depending upon valve dimensions and fluid pressure) between the flexible, electrically conductive, and S-curved film 130 and the switching electrodes 144 and 145 on the opposing plate 120. Electrostatic attraction induces the center 137 of the S-curved film 130 to move away from spacer 124 toward the spacer 122. This movement is encouraged by the outflow 152 of pressurized fluid (air) through aperture 116, an outflow facilitated by the presence of the acute vertex 126 of aperture 116. As will be appreciated, even if a relatively small differential voltage is constantly maintained on catch electrode 147, it will not be sufficient to stop film movement given the substantial switching voltage differentials transiently present during switching. Upon completion of switching from a blocking to a non-blocking position, the valve 110 appears as seen in FIG. 8. Again, there is substantially no difference between voltage sources 160, 161, 162, 63, and 166. The film 130 is maintained in the non-blocking position in part by differential electrostatic attractive forces between the film 130 and the catch electrode 148, maintained at a small differential voltage with respect to the film 130 by a voltage source 165. This small voltage differential between the film 130 and the catch electrode 148 helps pin the S-curved film in position, and prevents movement of the center 137 of this S-curved film from its position near spacer 122 toward spacer 124.

Figure 9:
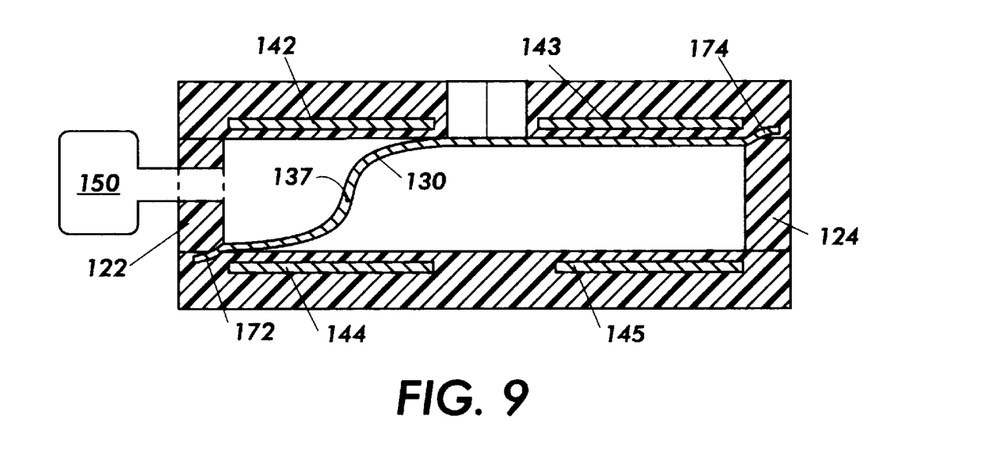
FIG. 9 is a side cross sectional view of a valve having a mechanical catch.

As will be appreciated, electrostatic catches are not required for operation of the present invention. As can be seen with reference to FIG. 9, it is also possible to substitute mechanical catches to hold a film in position when there is no substantial voltage differential between the switching electrodes and the film 130. In FIG. 9, the mechanical catches consist of curved lips 172 and 174 defined adjacent to spacers 122 and 124. These lips 172 and 174 have a small radius of curvature that creates stress bias in the film as it curves around the lips. Ordinarily, stress energy in the film is minimized when the center 137 of film 130 is adjacent to either one of spacer 122 or spacer 124 and the film is relatively straight. Substantial electrostatic forces must be applied to curve the film 130 around the lips 172 or 174 during switching. Because of this mechanical bistability, the film tends to stay in either the blocking or non-blocking position even absent catch electrodes as previously discussed.

Figure 10:
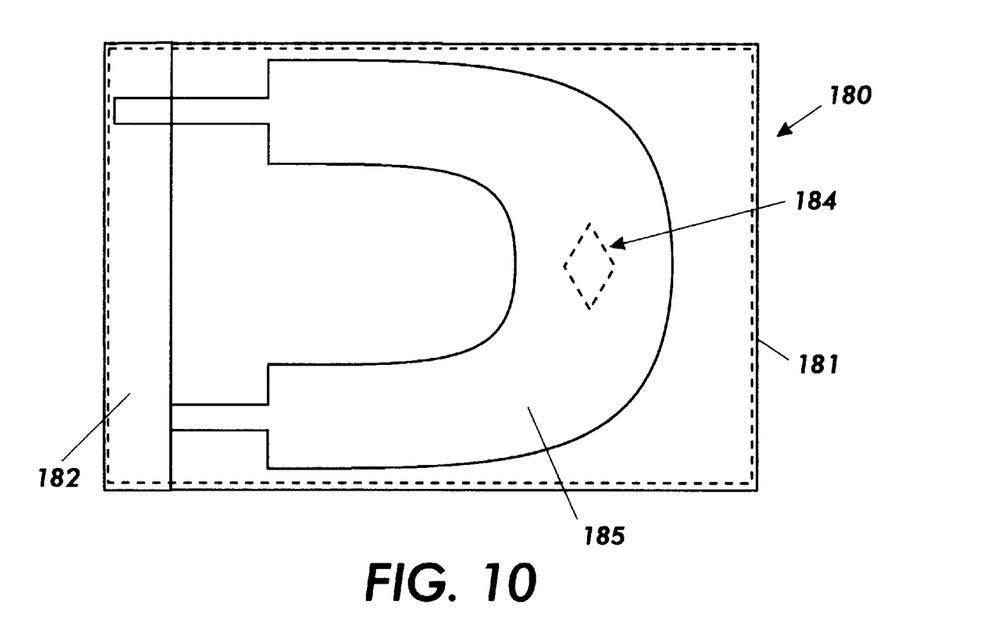
FIG. 10 is a top view of another valve embodiment having a generally U-shaped structure.
Figure 11:
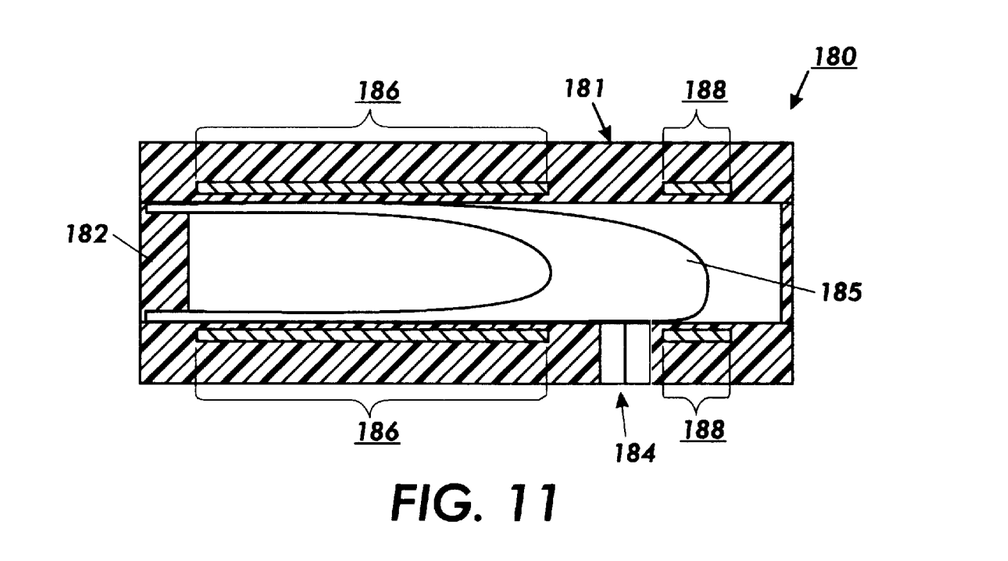
FIG. 11 is a side cross sectional view of the valve embodiment of the FIG. 10.

Alternative film structures and designs are also contemplated to be within the scope of the present invention. For example, FIGS. 10 and 11 illustrate a valve 180 having a U-shaped (horseshoe type) film 185 in a valve housing 181. The ends of the film 185 are vertically separated by a spacer 182 to allow formation of an S-curve in the film. An aperture 184 in the valve housing can be selectively blocked or unblocked by activation switching electrodes 186, and held in place after switching by catch electrodes 188.

Figure 12:
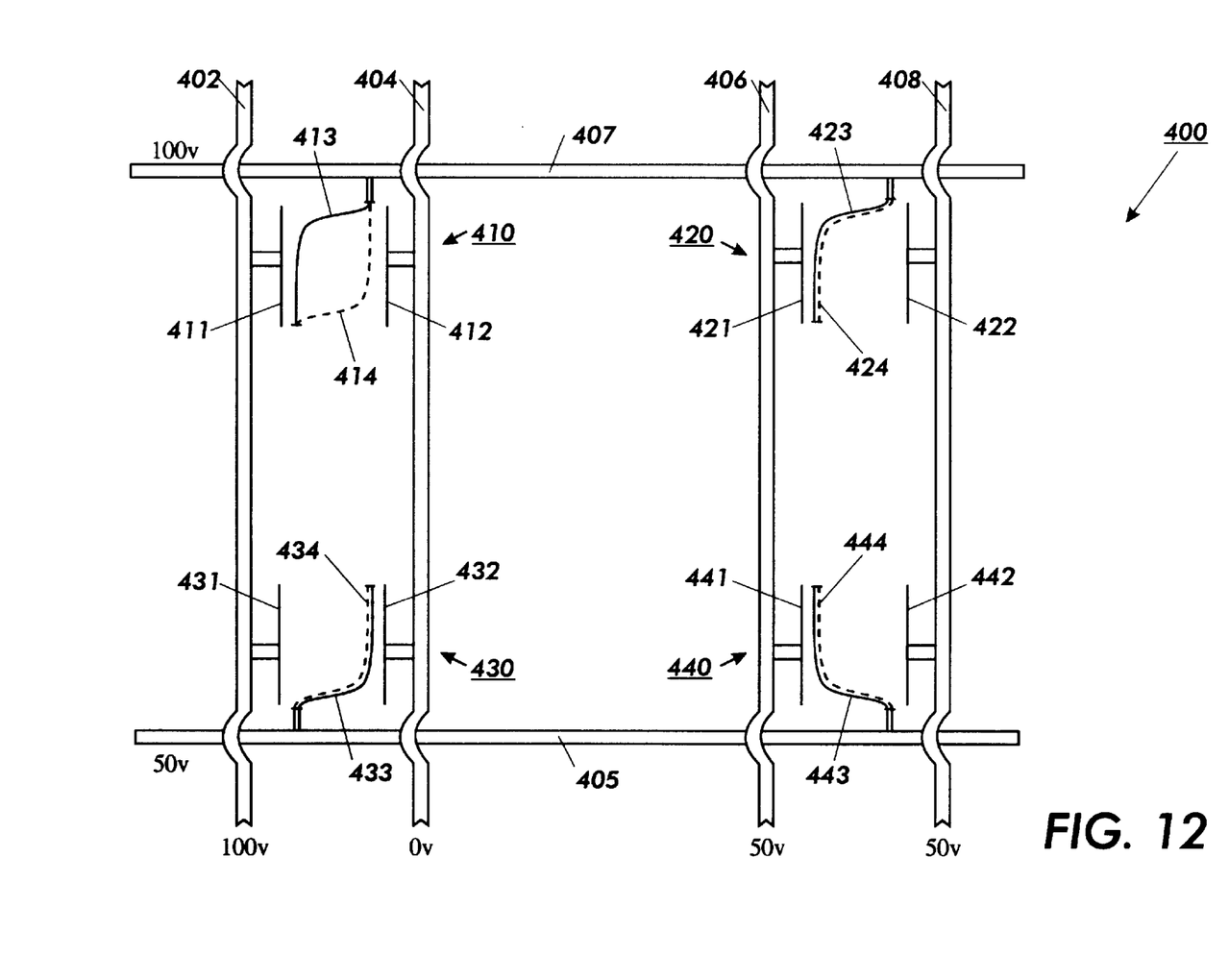
FIG. 12 is a schematic view illustrating voltage addressing of four valve sites, with one valve being switched while the remaining valves remain unswitched.

Switching operation through passive matrix addressing of arrays of valves having structures in accordance with the foregoing embodiments of the invention can best be seen with reference to FIG. 12. A four valve array 400 is schematically illustrated in FIG. 12, with four S-curve film valves 410, 420, 430, and 440 being controlled by voltage address lines. Each valve has identical structure, with a first electrode plate (electrode plate 411, 421, 431, or 441) separated from a second electrode plate (electrode plate 412, 422, 432, or 442). An S-curve film in a start position before switching (film 413, 423, 433, or 443) is indicated in solid line, while the after switching position is indicated by dotted outline (film 414, 424, 434, 444). Address line 402 is connected to plates 411 and 431, address line 404 is connected to plates 412 and 432, address line 404 is connected to plates 421 and 441, and address line 406 is connected to plates 422 and 442. In addition, address line 407 is connected to S-curve films 413 and 423, while address line 405 is connected to S-curve films 433 and 443.

FIG. 12 illustrates the procedure for switching valve 410 while leaving the remaining valves 420, 430, and 440 unswitched. Normally, all address lines are maintained at the same voltage (in this case 50 volts), so there is no voltage differential between the movable film and the plates that would induce switching between blocking and non-blocking positions, or between non-blocking and blocking positions. To switch valve 410, voltage in address line 410 is raised from 50 volts to 100 volts, voltage in address line 402 is also raised from 50 volts to 100 volts, and voltage in address line 408 is dropped from 50 volts to 0 volts. This leaves the final position 444 of the film unchanged in valve 440, since there is no voltage change at all, with all address lines remaining at 50 volts. The final position 424 of the film in valve 420 is also unchanged. Even though the film voltage has been raised to 100 volts from its previous 50 volts, the voltage differential between the plates 421 and 422 and the film is still only 50 volts, not enough of a differential to induce electrostatic switching since the voltage differential is below the switching threshold. Similarly, valve 430 remains unswitched, since the voltage differential between the plats 431 and 432 and the film is only 50 volts. However, the specifically addressed valve 410 will switch. In valve 410 the new voltage differential is 100 volts, enough to cause switching of the film from proximity to plate 411 to proximity to plate 412 in a new position 414. As those skilled in the art will appreciate, this illustrative example can be extended to allow for passive matrix addressing of arbitrary S-curve type valve elements in large valve arrays by simple voltage addressing, or even by AC voltage addressing, as long as a suitable voltage differential is instantaneously maintained.

Valve arrays controlling pressurized air jets as taught with respect to FIGS. 4 and 12 can be used for handling objects, including flexible objects such as paper. For example, a processing system 510 optimized for handling objects without requiring direct physical contact, including sheets of paper 512, is partially illustrated in FIG. 13. The processing system 510 has a conveyor 520, divided into lower section 522 and an upper section 524. For clarity, the upper section 524 is cut away to better illustrate paper movement, however, it will be appreciated that the upper section 524 and lower section 522 are substantially coextensive. The sections 522 and 524 are maintained in spaced apart relationship to define a passage 523 therebetween, with the passage sized to accommodate non-contacting passage therethrough of paper 512. Each section 522 and 524 has a plurality of independently or semi-independently controlled adjustable air jets 526 for dynamically supporting, moving, and guiding paper 52 through the system 510. At least some of these air jets 526 are controlled by valves in accordance with present invention, as exemplified with reference to those valve embodiments in FIGS. 1–12.

Figure 13:
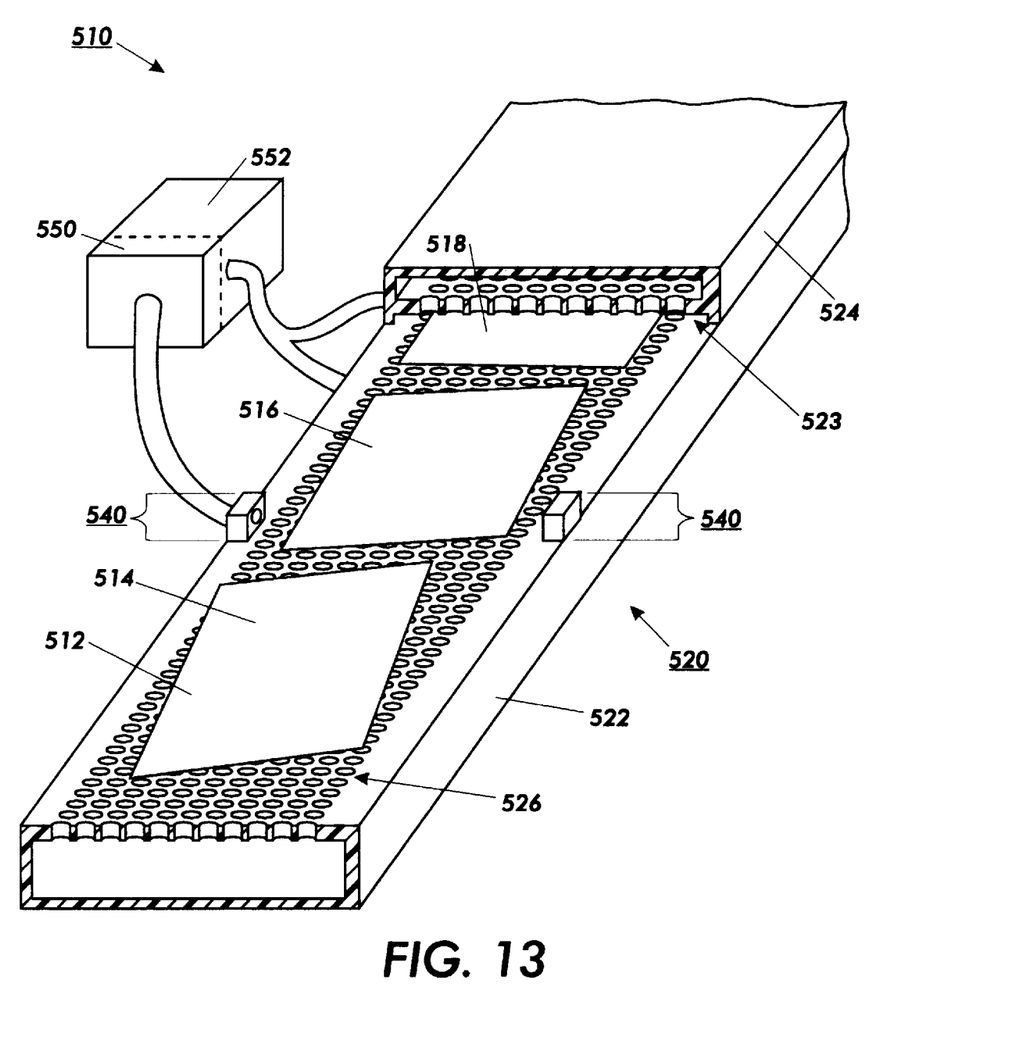
FIG. 13 illustrates a paper handling system for accurately moving air jet supported papers at high speeds using an array of valves in accordance with the present invention, with sensor units used to detect a paper, and a movement control unit connected to the sensor units to provide appropriate corrective input to air jets to maintain the paper on a desired path, velocity, and orientation.

Having opposed air jets in sections 122 and 124 permits adjustable application of air flow (by the directed air jets) to opposing sides of paper 112, dynamically holding the paper between sections 122 and 124, while allowing precise control of paper position, velocity, and orientation through application of vertical, lateral, or longitudinal forces (again by directed air jets). As an added advantage, the use of independent or semi-independent controlled adjustable air jets 526 allows for dynamically increasing or decreasing air flow directed against portions of paper 512, allowing straightening, flattening, curling, decurling, or other desired modification in paper topography, as well as adjustments to paper position, orientation and velocity. In addition, paper of various weights, sizes, and mechanical characteristics can be easily supported and accelerated by appropriate modification of the air flow applied by air jets 526. For example, a heavy, thick, and relatively inflexible cardboard type paper may require more air flow from the jets 526 for support and maneuvering, while a lightweight paper sheet may require less overall air flow, but may need quicker and more frequent air flow adjustments directed by the independent or semi-independent air jets 526 to compensate for flutter or edge curling effects.

Active flexible object guidance (of paper 512) to correct for flutter and other dynamic problems of flexible objects is enabled by provision of at least one sensing unit 540. The sensing unit 540 senses the motion state of paper 512, giving spatial and dynamic information (such as may be yielded from application of an optical imaging system or edge detection system) to a motion analysis unit 550 capable of calculating relative or absolute movement of paper 512 from the received information, with movement calculations generally providing overall position, orientation, velocity of paper 512, as well as position, orientation, and velocity of subregions of the paper 512 (due to flexure of the paper 512). Typically, the motion analysis unit 550 is a general purpose computer or dedicated hardware system capable of high speed image processing calculations necessary for determining object movement. Using this calculated movement information, a motion control unit 552 connected to the motion analysis unit 550 sends control signals to conveyor 520 to appropriately modify movement of paper 512 by selectively increasing or decreasing application of directed air jets to subregions of the paper 512 to reduce flutter, buckling, curling, or other undesired deviations from the desired motion state. As will be appreciated, use of discrete sensors, motion analysis units, and motion control units is not required, with integrated motion analysis and motion control assemblies being contemplated. In fact, it is even possible to provide a plurality of integrated sensors, motion analysis units, and motion control units as integrated microcontroller assemblies on the conveyor.

Whether the sensing unit 540 is discrete or integrated with microcontrollers, in order to ascertain object position properly the sensing unit 540 must be reliable and accurate, having a spatial and temporal resolution sufficient for tracking a relatively small area of the flexible object (typically at least about one square centimeter, although greater or lesser resolution is of course possible). Further, in many processes the object is moving quickly, allowing less than a 100 milliseconds for tracking measurements. Fortunately, optical sensors, video imaging systems, infrared or optical edge detectors, or certain other conventional detectors are capable of providing suitable spatial and temporal resolutions. For best results, two dimensional optical sensors (such as charge coupled devices (CCD's)), scanned one dimensional arrays, or continuous position sensitive detectors are utilized. However, fixed one dimensional sensor arrays can also be used. As will also be appreciated, contactless sensors other than optical sensors may be used, including but not limited to pressure sensors, acoustic sensors, or electrostatic sensors.

In operation, use of a sensing unit 540 for feedback control of object movement allows for precise micromanipulation of object motion state. For an illustrative example, in FIG. 13 paper 512 is sequentially illustrated in three distinct positions along conveyor 520, respectively labeled as paper position 514, paper position 516, and paper position 518. In position 514, the paper 512 arriving at the conveyor 520 is misaligned. As paper 512 is moved along conveyor 520 toward position 516 by air jets 526, the sensor 540 provides a time series of discrete spatial measurements that correspond to the instantaneous position of paper 512. These elements of a time series of spatial measurement information are continuously passed to the motion analysis unit 550. The motion analysis unit 550 uses the received information (i.e. the sensor measured one, two, or three dimensional spatial information) to accurately determine motion state of paper 512, including its position, velocity, and dynamics. This information (which may be collectively termed "trajectory") is passed to the motion control unit 552, which computes a corrective response to minimize error in trajectory and sends signals to selected air jets 526 to correct the misalignment, bringing the paper 512 closer to alignment as indicated by position 516. This feedback control process for properly orienting paper 512 by feedback controlled corrections to paper trajectory (the paper 512 now spatially located at position 516) is repeated, with the trajectory of paper 512 finally being correctly aligned as shown at position 518. As will be appreciated, this feedback control process for modifying the trajectory of flexible objects can be quickly repeated, with millisecond cycle times feasible if fast sensor, motion processing, and air jet systems are employed.

Advantageously, the present invention allows for manipulation and control of a wide variety of flexible objects and processes. In addition to paper handling, other flexible articles of manufacture, including extruded plastics, metallic foils, wires, fabrics, or even optical fibers can be moved in accurate three dimensional alignment. As will be appreciated, modifications in layout of conveyor 520 are contemplated, including but not limited to use of curved conveyors (with curvature either in a process direction or perpendicular to the process direction to allow for vertical or horizontal "switchbacks" or turns), use of cylindrical or other non-linear conveyors, or even use of segmented conveyors separated by regions that do not support air jets. In addition, it may be possible to construct the conveyer 520 from flexible materials, from modular components, or as interlocking segmented portions to allow for quick and convenient layout of the conveyor in a desired materials processing path.

The present invention permits ready detection and correction of trajectory, rotations, slight misalignments, three dimensional misalignments due to flutter, creases, edge turning, or other orientation problems that can be difficult to quickly detect and provide suitable movement compensation using standard material processing movement control systems. As will be appreciated by those skilled in the art, proper air jet construction and control is a critical aspect of the present invention. Typically, air jets must be constructed and positioned with respect to a flexible object to enable application of on the order of one millinewton of force to each side of the flexible object, with precise force values of course depending on material and dynamic properties of the flexible object, along with the desired object acceleration and trajectory. For best operation, the exerted air jet forces must be quickly changeable. For example, a typical 0.025 cm diameter orifice having a length of about 0.1 centimeter would be expected to have an intrinsic response time for air movement on the order of 100 microseconds. Of course valve response times, controllers, motion analysis, and pressure conditions must also be such that air jet operation and control occurs on a millisecond time scale.

Figure 14:
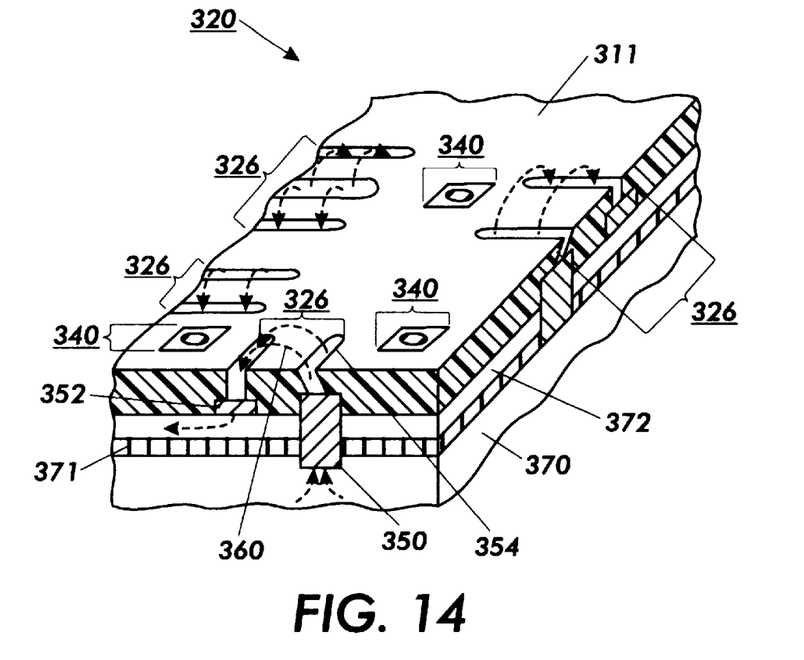
FIG. 14 is an exemplary illustration of a directed air jet system having valve controlled vertical, lateral, and longitudinal air jets, along with integrated sensor systems to enable accurate feedback controlled positioning of flexible objects in three dimensions.

A generic air jet architecture suitable for use in the present invention is illustrated with reference to FIG. 14. A portion of a flexible object conveyor 320 includes a variety of air jets 326 for enabling longitudinal, lateral, and vertical transport of flexible objects (flexible objects not shown for clarity). The air jets 326 include channels 354 defined in the conveyor surface 311 to allow exit or entrance of flowing air 360. For example, a single S-curve film type valve 350 (part of a two dimensional array of valves) in accordance with the present invention can be selectively operated by passive matrix addressing to permit high pressure air in plenum 370 to flow upward, impart momentum to flexible objects, and pass downward through valve 352 and into plenum 372. As shown in FIG. 10, plenum 372 is separated from plenum 370 by partition 371, with plenum 372 being maintained at a lower air pressure than plenum 370.

Control of flexible object path is enabled by provision of a plurality of integrated sensors 340, which can include, but are not limited to, optical, mechanical, thermal, electrostatic, or acoustic sensors. The sensors 340 are used to provide near continuous sensor feedback relating to object position, which in turn allows nearly continuous movement control of flexible objects passing adjacent to the air jets 326. As will be appreciated, information received from sensors 340 can be passed to a centralized motion analysis unit and motion control unit, such as described in connection with FIG. 13. Alternatively, distributed or local motion analysis and control can be employed. For example, sensors 340 can be integrated with computer microcircuitry capable of analyzing sensor input and directing control of air jets.

Figure 15:
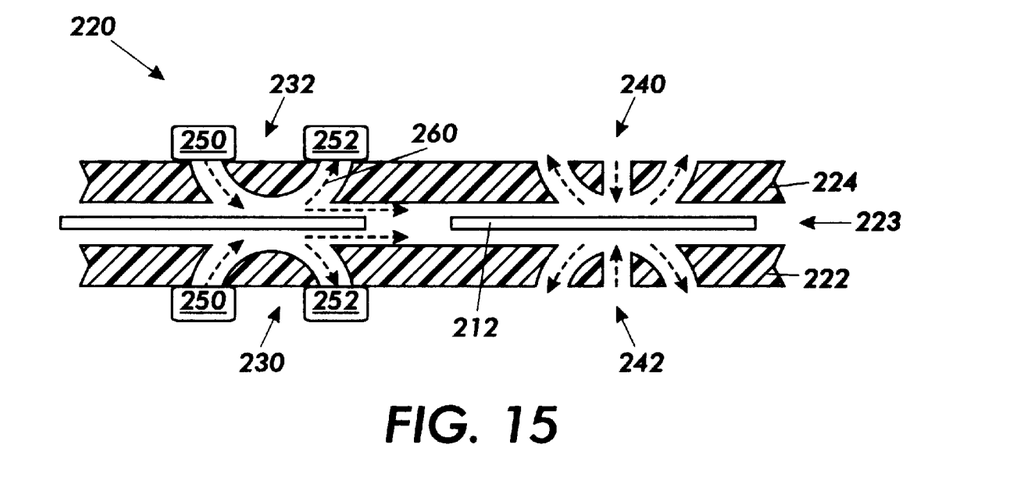
FIGS. 15 is a cross section of a directed air system similar to that illustrated in FIG. 14, illustrating directed air flow patterns.

FIG. 15 is a side view of a flexible object conveyor 220 that is divided into lower section 222 and a upper section 224, with a passage 223 therebetween, and each section 222 and 224 having a plurality of independently or semi-independently controlled adjustable air jets 26 for dynamically supporting, moving, and guiding paper 212 through the system. As previously explained in connection with FIG. 9, having opposed air jets in sections 222 and 224 permits adjustable application of air flow (by the directed air jets) to opposing sides of paper 212, dynamically holding the paper between sections 222 and 224, while allowing precise control of paper position, velocity, and orientation through application of vertical, lateral, or longitudinal forces (again by directed air jets). For example, longitudinal transport of paper 212 is encouraged by the combined action of air jets 230 and 232, positioned to oppose each other in respective sections 222 and 224. Air flow 260 is controlled by valves 250 and 252, with the air flow imparting longitudinally directed momentum to paper 212. As another example of controlling position of paper 212, opposed air jets 240 and 242 can be used to vertically direct air 260 to suspend paper 212 in a desired position in conveyor 220. This capability can even be extended to allow differential lateral or longitudinal tensioning of subregions of a piece of paper, permitting decurling, curling, reduction of flutter, or other desirable paper shaping effects.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

What is claimed is:

1. A passively addressable row and column array of bistable valves configurable to switch particular bistable valves comprising a plurality of bistable valves, with each bistable valve defining an aperture therethrough, having electrically conductive switching electrodes therein, and further having an electrically conductive bistable movable element for blocking the defined aperture, with the bistable movable element switchable between a stable aperture blocking position and a stable aperture open position upon application of a threshold switching voltage differential, a first switching voltage source connected to at least some of the bistable movable elements in the plurality of bistable valves for maintaining a first subset of the bistable movable elements at one of a non-switching and a switching voltage, and a second switching voltage source connected to at least some of the electrically conductive switching electrodes for maintaining a second subset of the electrically conductive switching electrodes at one of a non-switching and a switching voltage, with those bistable valves that are members of both the first subset maintained at the switching voltage and the second subset maintained at the switching voltage having an applied threshold switching voltage differential sufficient to switch only those bistable valves.

2. The passively addressable row and column array of bistable valves of claim 1, wherein the bistable movable elements are cantilever beams.

3. The passively addressable row and column array of bistable valves of claim 1, wherein the bistable movable elements are maintained in a normally open position by fluid pressure.

4. The passively addressable row and column array of bistable valves of claim 1, wherein the bistable movable elements are maintained in a normally closed position by fluid pressure.

5. The passively addressable row and column array of bistable valves of claim 1, further comprising a plurality of catches, with at least one catch in each of the plurality of valves for reducing unswitched movement of the bistable movable elements, the catches maintaining a catch force less than a switching force applied by the switching electrodes to switch the bistable movable elements.

6. The passively addressable row and column array of bistable valves of claim 5, wherein each catch in each of the plurality of valves further comprises at least two catch electrodes, with a catch voltage maintained on the at least two catch electrodes being less than a switch voltage.

7. The valve of claim 6, wherein the catch voltage maintained on the at least two catch electrodes is constant.

8. The valve of claim 5, wherein each catch in each of the plurality of valves further comprises at least two mechanical catches, with force required to overcome the mechanical catches being less than a switching force applied by the switching electrodes.

* * * * *